S. HERR.
SEED RECLEANING MACHINE.
APPLICATION FILED JAN. 24, 1916.
1,199,549.
Patented Sept. 26, 1916.
2 SHEETS—SHEET 1.
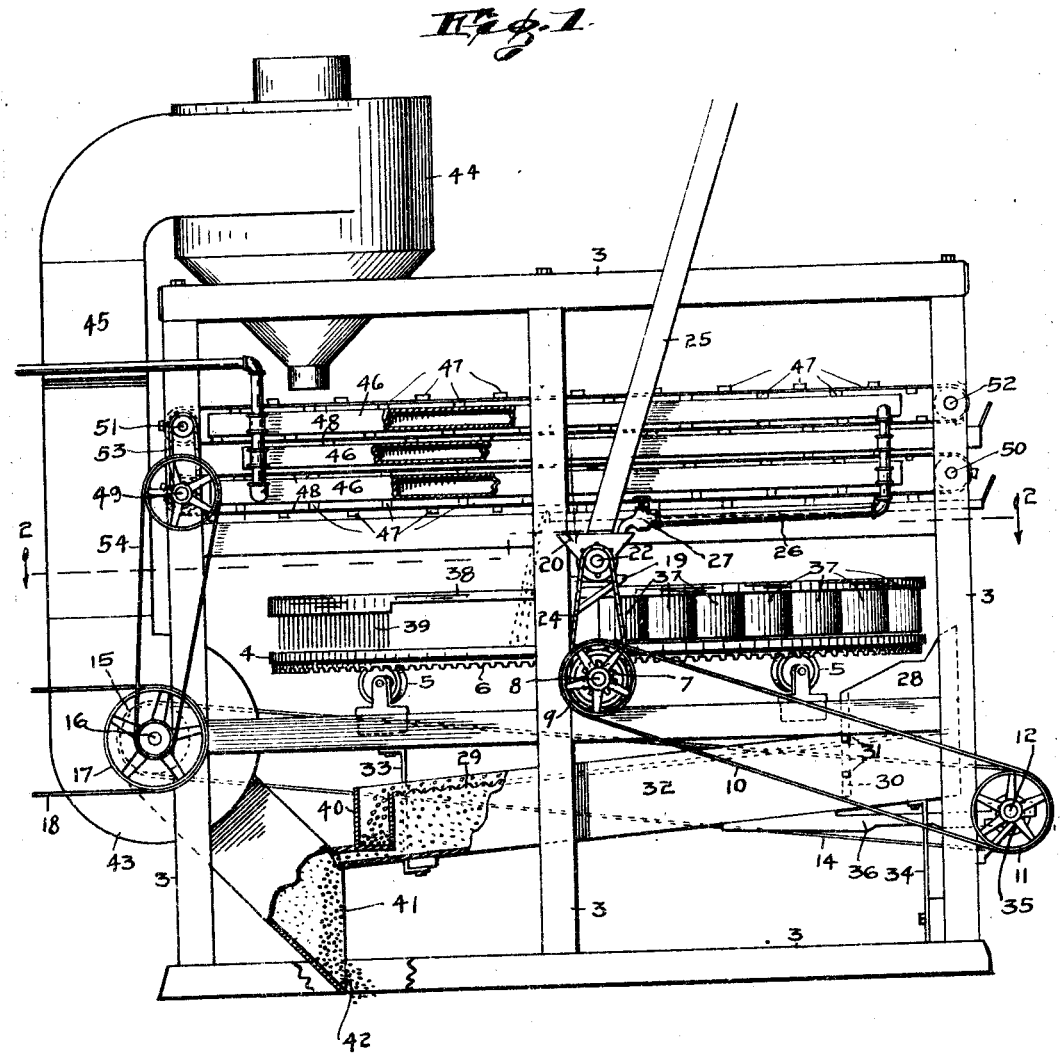

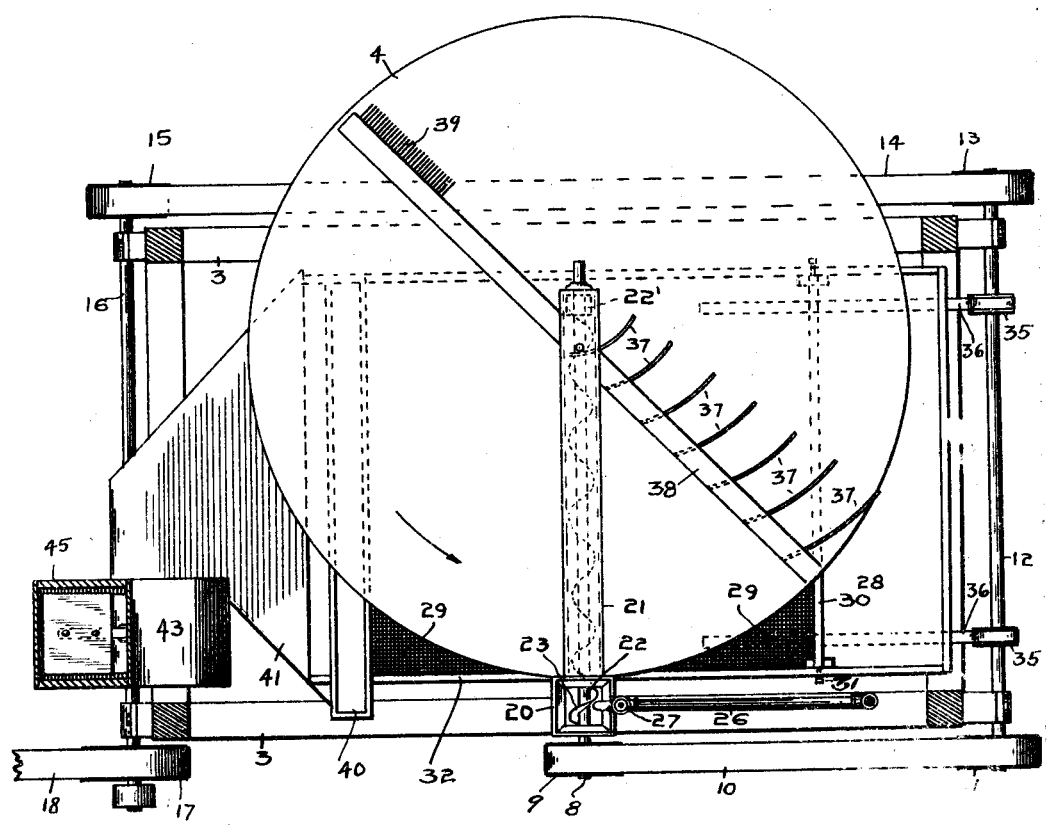

UNITED STATES PATENT OFFICE.

SHIRL HERR, OF CRAWFORDSVILLE, INDIANA.

SEED-RECLEANING MACHINE.

1,199,549.  Specification of Letters Patent.  Patented Sept. 26, 1916.

Application filed January 24, 1916. Serial No. 73,910.

*To all whom it may concern:*

Be it known that I, SHIRL HERR, a citizen of the United States, residing at Crawfordsville, in the county of Montgomery and State of Indiana, have invented certain new and useful Improvements in Seed-Recleaning Machines, of which the following is a specification.

The object of this invention is to improve on the mechanism illustrated and described in my Patent No. 813,890, issued February 27, 1906, for removing buckhorn and other seeds having a surface coating which becomes mucilaginous when moistened, from clover-seed, by providing a more efficiently operating machine, that is, one which will more rapidly and more thoroughly clean the clover-seed, and by providing a machine which will be cheaper to construct and also to keep in repair.

I accomplish the objects of the invention by the mechanism illustrated in the accompanying drawings, in which—

Figure 1 is a side elevation of my invention showing some portions thereof in vertical section, and Fig. 2 is a horizontal section on the line 2—2 of Fig. 1.

Like characters of reference indicate like parts throughout the several views of the drawings.

In this machine the seed to be cleaned is moistened and is deposited in this condition with dry saw-dust at the center of a rotating table where it is spread and worked from thence to the edge of the table where it is pushed off upon a vibrating screen through which the clover-seed passes but the meshes of which are too fine for the saw-dust with adhering buckhorn to pass through.

The various parts of the machine are supported by a main frame 3. A horizontal table 4, is mounted on rollers 5, which are supported by the frame 3, and on the under side of the table is an annular gear 6 which is driven by a pinion 7, on a horizontal shaft 8. On the outer end of the shaft 8 is a pulley 9 which is connected by a belt 10, with a pulley 11, on a shaft 12 at the end of the frame 3. A pulley 13, on the other end of shaft 12 is connected by a belt 14, with a pulley 15, on a shaft 16, at the other end of frame 3 from shaft 12. A pulley 17 on shaft 16 is driven by a belt 18, from any suitable source of power (not shown).

Supported on a bracket 19, from the frame 3, is a hopper 20 which communicates with a conveyer box 21, which discharges upon the table 4, near the center of the latter, through an opening 22', shown in dotted lines in Fig. 2. Mounted in and longitudinally of the box 21 is a shaft 22 upon which is screw-conveyer 23. A sprocket wheel on the outer end of the shaft 22 is connected by a chain-belt 24 with a sprocket wheel on the shaft 8. The seeds to be cleaned are supplied to the hopper 20, through a tube 25, from any suitable repository, (not shown). Water for wetting the seeds is supplied to the hopper 20, through a pipe 26, having a cock 27 for regulating the supply. Water of condensation from the steam-heated tables which are used for drying the saw-dust, is here shown as being utilized for wetting the seeds.

Located under the table 4 at one side of the seed-box 21, near the edge of the table where it catches the mixed sawdust and seeds pushed off of the latter, is a hopper 28, which discharges through its lower portion upon a woven wire screen 29. The discharge from the hopper is under the vertically adjustable inner hopper-side 30, which may be raised and lowered in suitable guideways and held by set-screws 31, to determine the thickness of the layer of seeds passing under to the screen. The screen 29 is supported near the top of a vibrating box 32, of which the hopper 28 is also a part. The box 32 is supported by spring-bars 33 and 34 which bend to permit the box to vibrate under the action of eccentrics 35, acting through bars 36 which are attached at one of their ends to the bottom of the box, and have rings at their other ends surrounding the eccentrics.

The dry saw-dust and the moistened seed which are deposited upon the table 4, are distributed and mixed and pressed together to cause the buckhorn to adhere to the sawdust, and the mixture is gradually worked to the edge of the table and off into hopper 28. The leveling of the mixture and its movement to the edge and off of the table is secured by a series of curved and substantially vertical plates 37, which are held in a fixed position relative to the table by a horizontal stationary bar 38, to which the upper edges of the plates are fastened. The lower edges of the plates barely clear the top of the rotating table, and the mixed saw-dust and seeds carried by the table into contact with the plates are moved in obedience to the shapes and positions of the latter. A thin even layer of more or less compacted material is left on the table after passing the plates, and this is stirred up and mixed by a brush or rake, preferably of wires 39, depending from the opposite portion of the bar 38.

The seed and saw-dust mixture coming from the table, through the hopper 28, to the screen 29, is sifted by the latter. The meshes of the screen are such in size as to allow the clover-seed and saw-dust of like proportions to pass through, but he uckhorn with its adhering saw-dust cannot go through on account of size, and by reason of a slight inclination of the screen these masses move toward the low end where they discharge into a box 40, from which they are tailed off or removed in any suitable manner and disposed of.

The clover-seed and smaller saw-dust which have passed through the screen 29, fall upon the bottom of the box 32, down which they pass by gravity, under box 40, and out through an opening in the lower end of the box 32, and across the mouth of a chute 41. The clover-seed, on account of its greater weight, is discharged from the machine at 42, while the lighter saw-dust is drawn up the chute 41, by the suction of a fan rotating on the shaft 16, in the fan-housing 43, and is discharged through a chute 45 into a holder 44, on top of the frame 3. The saw-dust lost during the operation of the machine by its adherence to the discarded buckhorn is compensated for by adding the requisite amount of fresh saw-dust to the holder 44, from time to time; and before any saw-dust is used on table 4, it is thoroughly dried. This drying is done by spreading the saw-dust upon steam-heated tables 46, three of which are shown, but as many may be used as is necessary to thoroughly dry the material,—along which tables the saw-dust is moved by transverse slats 47, carried by link belts 48, which pass around sprocket-wheels on suitable shafts 49, 50, 51 and 52. The shafts 49 and 51 have sprocket wheels which are connected by a belt 53, and the shaft 49 has a pulley which is connected by a belt 54, with a pulley on the shaft 16.

The three tables shown in Fig. 1, are each heated by steam introduced into closed chambers under them through a pipe 55, and the water of condensation is drawn off, as previously stated, for use in wetting the seeds to be cleaned. The drying means is placed in such close proximity to the mixing and spreading means, that the saw-dust will not lose its absorbent quality by exposure to the air before it is used.

The saw-dust from holder 44 is discharged through its hopper-shaped bottom upon the top drying table, along which it is raked by slats 47, and raked off the end of that table upon the projecting end of the middle one. It is drawn along this middle drying table and off of its end upon the lowest drying table, which also suitably projects, by suitable traveling slats. In like manner it is moved along the lowest drying table and is discharged from the end of the latter upon a fourth table which suitably projects but which terminates at its inner end across the middle of the platform 4, and the saw-dust, now thoroughly heated and dry, is raked by the traveling slats off of said fourth table and falls upon the rotating table 4, below. The operation from here to the completion of the cleaning of the seeds has been described in connection with the mechanism of the machine, and need not be repeated.

While I have described my invention with more or less minuteness as regards details of construction and arrangement and as being embodied in certain precise forms, I do not desire to be limited thereto unduly or any more than is pointed out in the claims. On the contrary, I contemplate all proper changes in form, construction and arrangement the omission of immaterial elements and the substitution of equivalents, as circumstances may suggest or as necessity may render expedient.

I claim—

1. In a machine for separating mucilaginous seeds from others, means for moistening seeds, means for drying an absorbent material, means for thereafter separating the resulting product to obtain the non-mucilaginous seeds and means in proximity to and interposed between the drier and the separating means, having means for positively and thoroughly mixing the absorbent material and the moistened seeds.

2. In a machine for eliminating mucilaginous seed from clover seed, a drier for saw-dust, means for moistening the mixture of seed, means for separating out sawdust and clover seed from the united grains of saw-dust and mucilaginous seed, means for separating the clover from the non-united saw-dust, means in proximity to and interposed between the drier and the separating means, having means for positively and thoroughly mixing the sawdust and the moistened seeds, and means for returning the separated saw-dust to the drier.

3. In a machine for separating mucilaginous from non-mucilaginous coated seeds, a moving table, means for depositing a moistened mixture of said seeds on the table, means for mixing a material with said last mixture to which the moistened mucilaginous seeds will adhere, and means for separating said last material with its adhering seeds from the other seeds and means assisted by the movement of the table for discharging said mixed material from the table to said separating means.

4. In a machine for separating mucilaginous from non-mucilaginous coated seeds, a rotating table, means for depositing a moistened mixture of said seeds on the table, means assisted by the movement of the table for mixing a material with said last mixture to which the moistened mucilaginous seeds will adhere, a vibrating screen which will arrest the last material with adhering seeds and allow the other seeds to pass through, and means to deposit said mixture from the table to the screen.

5. In a machine for separating mucilaginous from non-mucilaginous coated seeds, a rotating table, means for depositing a moistened mixture of said seeds approximately at the middle of the table, means for depositing a dry material like saw-dust on the table, means for mixing said last material with the moistened seeds, and means for separating the non-adherent seeds from the last mixture.

6. In a machine for separating mucilaginous from non-mucilaginous coated seeds, a rotating table, means for depositing a moistened mixture of said seeds approximately at the middle of the table, means for depositing a dry material like saw-dust on the table, plates held in a relatively fixed position in the path of the material on the table to level and spread said material and move it toward the edge and off of the table, means to stir and mix the material while it is on the table, and means to gather the material falling from the table and separate from it the non-mucilaginous seeds.

7. In a machine for separating mucilaginous from non-mucilaginous coated seeds, a rotating table, means for depositing a moistened mixture of said seeds approximately at the center of the table, a saw-dust holder above the table, means between the holder and table for drying the saw-dust to increase the adhesiveness to it of the mucilaginous seeds and for depositing the dry saw-dust on the table, means to mix the saw-dust and seeds together and move the mixture off of the table, a vibrating screen to remove the saw-dust with adherent seeds from the non-adherent saw-dust and seeds, and suction means for separating said last saw-dust from the seeds and for depositing the removed saw-dust in said saw-dust holder.

8. In a machine for separating mucilaginous from non-mucilaginous coated seeds, a rotating table, means for depositing a moistened mixture of said seeds approximately at the center of the table comprising a conveyer-box, a conveyer therein, a hopper, a seed-delivery tube and a water pipe discharging into the hopper; a saw-dust holder above the table, means between the holder and rotary table comprising steam-heated tables for drying the saw-dust and for depositing it on the table, relatively fixed plates in the path of the seed and saw-dust mixture on the table to level and spread it and move it off the table, means to stir and mix it while on the table, a vibrating screen to receive the mixture dropping from the table and separate the saw-dust with adherent seeds from the non-adherent saw-dust and seeds, and suction means for separating said last saw-dust and seeds from each other and for depositing the removed saw-dust in said holder.

In witness whereof, I, have hereunto set my hand and seal at Indianapolis, Indiana, this 17th day of December, A. D. one thousand nine hundred and fifteen.

SHIRL HERR. [L. S.]